Nov. 4, 1941.                    H. W. KOST                    2,261,650
                                 FASTENER
                            Filed Sept. 13, 1939
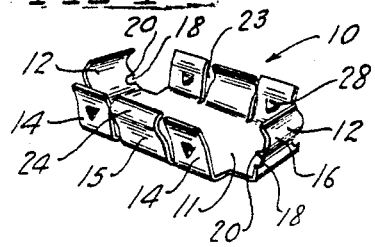
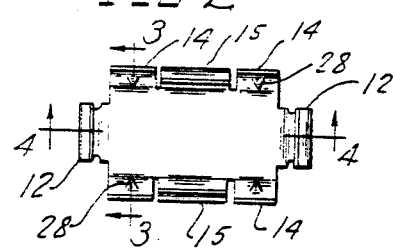
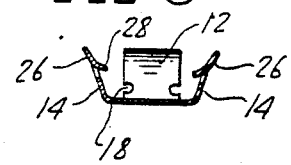
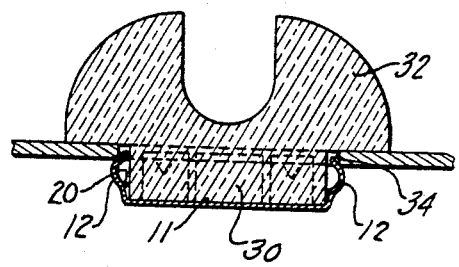
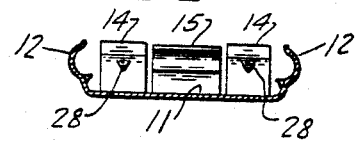
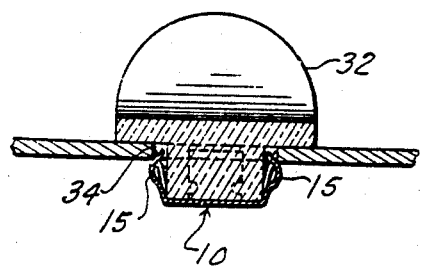
Inventor
Harold W. Kost
By
Attorney Patented Nov. 4, 1941

2,261,650

UNITED STATES PATENT OFFICE 2,261,650

FASTENER

Harold W. Kost, Birmingham, Mich., assignor to Detroit Harvester Company, Detroit, Mich., a corporation of Michigan Application September 13, 1939, Serial No. 294,720

4 Claims. (Cl. 24—73)

This invention relates to improvements in fasteners and is particularly, though not exclusively, directed to a stud fastener for supporting a part or article in an aperture in a panel or the like, the stud fastener being provided with snap fastener means for engagement with the wall of the aperture.

An object of the present invention is to provide a snap fastener of this character with means for gripping the article, the snap fastening means cooperating therewith to render the gripping means effective upon assembly with a panel or other support.

A further object of the invention is to provide a stud fastener with integrally formed snap fastening means in the form of a plurality of resilient fingers having portions thereof deformed to permit ready installation in a supporting structure and to retain the fastener and article supported thereby in position with respect to such structure.

A further object of the invention is to provide a stud fastener of this character with a plurality of resilient fingers having gripping portions for securely retaining the same on the stud, and deformed portions for positively locating and retaining the article adjacent an aperture in a supporting structure which enables the assembly to be readily inserted therein and subsequently retained against unintentional displacement or removal.

Further objects and advantages will become apparent from a study of the following description when taken in connection with the accompanying drawing, in which:

Figure 1 is a perspective view of a form of fastener which incorporates the present invention;

Figure 2 is a top plan view of the fastener illustrated in Figure 1;

Figure 3 is a vertical sectional view taken substantially on the line 3—3 of Figure 2;

Figure 4 is a vertical sectional view taken substantially on a line 4—4 of Figure 2;

Figure 5 is a longitudinal sectional detail through a shelf bracket support and the fastener of the present invention illustrating the fastener in use; and Figure 6 is a transverse sectional view of the structure shown in Figure 5.

Referring to the drawing and particularly to Figures 1 to 6 thereof, the form of the invention chosen for illustration comprises a generally rectangular fastener having a body or base portion arranged to embrace the end of a stud or shank of a part or article to be secured in an aperture in a panel or the like, and having integral spring fingers adapted to embrace the sides and ends of such a stud. Certain of the fingers are provided with stud engaging teeth or projections arranged to bite into the stud or impinge thereon with sufficient force to retain the fastener on the stud when assembled with the panel, while other fingers are formed with snap fastening means adapted to engage the walls of the aperture in the panel or other support to retain the fastener and the stud portion of the article therein. The fingers are formed so that portions thereof engage the walls of the aperture to securely position the assembly, as well as to restrain the same from unintentional displacement or removal.

The fastener chosen for illustration has particular utility in connection with shelf supports and has been illustrated for use therewith, it being understood that the present invention is not to be limited to such use, but that the fastener is intended to be used in any situation where a stud or shank is provided on a part or article to be fastened to a panel, or the like, having a hole or aperture therein to receive the stud or shank and the fastening element.

10 represents the fastening element of the present invention as incorporated in a generally rectangular structure for use with a member provided with a similarly shaped stud or shank portion. The stud fastener 10 is preferably formed of resilient sheet metal and comprises a plane body or base portion 11 from which project generally upwardly, a plurality of fingers 12, 14 and 15. Fingers 12 are formed integral with and project upwardly and outwardly from the ends of the body portion 11, while fingers 14 and 15 are similarly formed from the sides of the body portion.

Each finger 12 is formed with a protuberant portion in the form of a transverse rib or projection 16 adjacent its upper extremity, projection 16 being of generally arcuate cross section and extending outwardly to provide snap fastening means engageable with the end walls of a slotted aperture in a manner hereafter appearing. Each side edge of finger 12 has a notch 18 formed therein at the juncture of the projection 16 and the lower portion of the finger. The notches 18 are cut out of the edge of the finger so as to produce teeth or points at 20, which are subsequently turned inwardly to provide article gripping portions adapted to be embedded into the softer material of the stud.

The fingers 14 and 15 are projected from the sides of the body portion 11 and also extend upwardly and outwardly, there being two fingers 14, and a single finger 15 at each side thereof. These fingers are separated by slits or slots 23, fingers 15 being provided with transversely disposed outwardly extending projections 24 similar to those provided on the fingers 12. A finger 14 is located at each side of the finger 15 and is provided with a further diverging portion 26 intermediate its upper extremity and the base portion 11. The fingers 14 are also provided with inwardly extending teeth or points 28 pierced generally centrally thereof and projected inwardly to form additional article gripping portions. Although the fingers normally extend generally upwardly and outwardly from the body portion, they are adapted to be compressed inwardly due to the resiliency of the material and thus impart an outward force upon the walls of the aperture upon being positioned therein, which retains the assembly in the aperture.

As particularly shown in Figures 5 and 6, the fastener has been assembled with a generally rectangular stud or shank portion 30 of a shelf support 32. The support 32 is provided with a transverse groove to slidably receive the frame of a shelf in a refrigerator cabinet or the like, as will be readily understood. It will be apparent that to assemble such a support on the interior of a refrigerator, for example, presents numerous difficulties, particularly with respect to supporting and securing such brackets on the walls thereof. By means of the present invention, a hole or an aperture of the general shape of the stud portion of the bracket may be provided in the panel during its formation. In this instance the aperture is generally rectangular and is designated at 34. After the cabinet structure is assembled, the supports 32 may be secured therein by use of the fastener herein described.

In use, it will be seen that the body portion 11 of the fastener engages the end of the stud 30, while the arms 12, 14 and 15 embrace the ends and sides of the stud and by means of the teeth or points, the fastener is grippingly retained with respect thereto due to the force imparted to the fastener while positioned in the aperture. The snap fastening means 16 and 24 permit such insertion into the aperture and then spring outwardly to resiliently but firmly support and retain the fastener as well as the support 32 in proper position with respect to the wall of the panel. As shown in Figure 5, the fingers 12 bear against the end portions of the slotted aperture 34, a portion of projection 16 being in yieldable engagement with the lower edge of the aperture wall. In Figure 6, the fingers 15 have the same bearing engagement with the side walls of the aperture as do fingers 12 with respect to the ends of the aperture. In addition, the upper extremities of fingers 14 resiliently engage the side walls of the aperture to urge the points 28 into the material of the stud, as well as to cooperate with the fingers 15 to retain the assembly in position.

Although the fastener has been illustrated for use with a stud of particular shape, it is to be understood that the fastener may be equally well adapted for use with studs of other shapes, it being merely necessary to alter the general contour of the structure. It is to be further understood that although the shelf support 32 is of plastic material, the fastener is equally applicable to elements of metal, porcelain, wood or other similar materials having integral or separable stud portions thereon. The teeth or points are embedded in the softer material of the plastic or die cast element to militate against separation of the element from the fastener and thus from the apertured panel.

From the foregoing description it will be apparent that a stud fastener has been provided which comprises a body portion having integral resilient fingers projecting therefrom, provided with means for impinging upon or gripping a stud for retaining the latter in assembled relation therewith, and with snap fastening means for engagement with the wall of the aperture. It will also be noted that both means may be provided on separate fingers or a single finger and that the aperture wall retains the article gripping portions in engagement with the stud and maintains the snap fastening means and the stud in assembled relation with respect to a supporting structure.

It will also be apparent from the foregoing description that various modifications may be made in the fastener without departing from the spirit of the invention and it is to be understood that the invention contemplates arrangements other than herein specifically disclosed.

What I claim is:

1. A stud fastener comprising a sheet metal body having a bottom to abut against one end of a stud, said body having a pair of opposed fingers in substantial alignment formed with spaced sides and inwardly curved outer ends, a tooth in each side of the fingers located between the curved ends thereof and the bottom of the body and formed to be embedded into the stud, and other fingers carried by the body and located on opposite sides of a line drawn between the first-named fingers.

2. A stud in accordance with claim 1, wherein the said other fingers are each formed with teeth located between the ends of the fingers to engage the stud thereby to cause the fingers to be moved outwardly into engagement with the adjacent walls of the aperture of the member to which the stud is to be connected.

3. A stud fastener comprising a sheet metal body having a bottom to abut against an end of a stud, integral fingers connected to the body and projecting outwardly therefrom and having spaced sides and inwardly curved outer ends to engage with the walls defined by an aperture formed in a member to which the stud is to be secured, and teeth projecting inwardly from the fingers and located inwardly of the curved ends thereof and formed to engage the adjacent parts of the stud so as to force the curved ends of the fingers into engagement with the walls defining the aperture of said member.

4. A stud fastener comprising a substantially rectangular sheet metal body adapted to conformably engage a stud of like configuration, said body having a pair of end fingers formed with spaced sides and inwardly curved outer ends and with inwardly extending teeth carried by their sides and located between the ends of the fingers, a central finger carried by each side of the body and having a curved outer end, and a pair of fingers spaced from and located on opposite sides of the central fingers and having their outer ends curved outwardly, and teeth carried by each of said pairs of side fingers and extending inwardly toward the interior of the body, all of the aforementioned fingers being formed to engage the walls of a substantially rectangular aperture formed in a member to which the stud is to be connected, and all of the aforementioned teeth of the various recited fingers being formed to engage the sides of the stud so as to force the outer ends of the fingers outwardly against the respective walls of the aperture formed in the member to which the stud is to be connected.

HAROLD W. KOST.